United States Patent
Fotta et al.

(10) Patent No.: US 8,577,009 B2
(45) Date of Patent: Nov. 5, 2013

(54) AUTOMATIC COMPLAINT REGISTRATION FOR VIOLATIONS OF TELEPHONIC COMMUNICATION REGULATIONS

(75) Inventors: Keith A. Fotta, Duxbury, MA (US); Richard P. Boudrieau, Duxbury, MA (US)

(73) Assignee: First Orion Corp., Conway, AR (US)

(*) Notice: Subject to any disclaimer, the term of this patent is extended or adjusted under 35 U.S.C. 154(b) by 1940 days.

(21) Appl. No.: 11/550,496

(22) Filed: Oct. 18, 2006

(65) Prior Publication Data
US 2008/0095347 A1    Apr. 24, 2008

(51) Int. Cl.
H04M 3/42    (2006.01)

(52) U.S. Cl.
USPC .................. 379/210.02; 379/207.02

(58) Field of Classification Search
USPC ............ 379/211.02, 207.16, 230, 211.11, 32, 379/201.11, 210.02, 196, 201.12, 114.14, 379/88.02, 210.03, 355, 373; 455/413, 428; 370/352, 353, 354, 355, 356, 357; 705/7.15, 317
See application file for complete search history.

(56) References Cited

U.S. PATENT DOCUMENTS

| | | | |
|---|---|---|---|
| 6,327,345 B1 * | 12/2001 | Jordan | 379/88.02 |
| 6,453,019 B1 | 9/2002 | Latter et al. | |
| 6,697,475 B1 * | 2/2004 | MeLampy et al. | 379/201.12 |
| 6,765,994 B2 | 7/2004 | Latter et al. | |
| 6,771,950 B1 | 8/2004 | Shupe et al. | |
| 6,782,268 B1 | 8/2004 | Thompson et al. | |
| 6,853,717 B1 | 2/2005 | Frentz et al. | |
| 6,990,187 B2 | 1/2006 | MacNamara et al. | |
| 7,068,761 B2 | 6/2006 | Latter et al. | |
| 7,283,969 B1 * | 10/2007 | Marsico et al. | 705/346 |
| 7,552,058 B1 * | 6/2009 | Zhang | 705/1.1 |
| 2002/0012426 A1 * | 1/2002 | Gupton | 379/210.02 |
| 2002/0071529 A1 * | 6/2002 | Nelkenbaum | 379/88.13 |
| 2002/0085700 A1 | 7/2002 | Metcalf | |
| 2003/0212566 A1 * | 11/2003 | Fergusson et al. | 705/1 |

(Continued)

FOREIGN PATENT DOCUMENTS

EP    1 691 538 A    8/2006

OTHER PUBLICATIONS

Hirschman, Brant C.; Swinehart, Grant E.; Todd, Marie L.; LASS: Putting the telephone customer in charge; May 1985, AT&T Bell Labs—Record, pp. 10-16.*

(Continued)

Primary Examiner — Fan Tsang
Assistant Examiner — Kharye Pope
(74) Attorney, Agent, or Firm — Gottlieb, Rackman & Reisman PC

(57) ABSTRACT

In an embodiment, a method comprises receiving call information to record a complaint from a called party against a calling party relating to receipt of a call and adding the call information to a complaint database. The call information may be retrieved from the complaint database and a check made for a match between called party information in a regulatory database and the call information. The call information may be updated in the complaint database based on results of the match checking. Reverse lookup information in a third party database may be requested with the call information updated in the complaint database based on results of the request. An entity may request complaint information from the complaint database. In response to the request, an application server may retrieve the requested complaint information from the complaint database and deliver the retrieved complaint information to the entity.

18 Claims, 6 Drawing Sheets

(56) References Cited

U.S. PATENT DOCUMENTS

| | | | |
|---|---|---|---|
| 2004/0114747 A1* | 6/2004 | Trandal et al. | 379/211.02 |
| 2004/0148506 A1* | 7/2004 | Prince | 713/176 |
| 2004/0213396 A1* | 10/2004 | MacNamara et al. | 379/210.02 |
| 2004/0218743 A1* | 11/2004 | Hussain et al. | 379/201.11 |
| 2005/0105510 A1* | 5/2005 | Reding et al. | 370/352 |
| 2005/0143064 A1* | 6/2005 | Pines et al. | 455/428 |
| 2005/0201362 A1* | 9/2005 | Klein et al. | 370/352 |
| 2005/0220286 A1* | 10/2005 | Valdez et al. | 379/211.02 |
| 2005/0246344 A1* | 11/2005 | Keller et al. | 707/10 |
| 2006/0182029 A1* | 8/2006 | Kealy et al. | 370/230 |
| 2009/0016499 A1* | 1/2009 | Hullfish et al. | 379/93.01 |

OTHER PUBLICATIONS

Srivastava, K., et al., "Preventing Spam for SIP-based Instant Messages and Sessions," [online] Oct. 28, 2004, Retrieved from the internet URL: http://www.cs.columbia.edu/techreports/cucs-042-04.pdf retrieved on May 5, 2006.

Dantu, et al., "Detecting Spam in VoIP Networks," SRUTI: Steps to Reducing Unwanted Traffic on the Internet Workshop, XP002405070, pp. 31-37 (2005).

\* cited by examiner

| CALLING PARTY DN 302 | CALLED PARTY DN 304 | DATE OF CALL 306 | TIME OF CALL 308 | REVERSE LOOKUP CALLING PARTY 310 | REVERSE LOOKUP CALLED PARTY 312 | CALLED PARTY NOTES 314 | REGULATORY DB VIOLATED 316 | OTHER 318 |
|---|---|---|---|---|---|---|---|---|

AUTOMATIC COMPLAINT REGISTRATION FOR VIOLATIONS OF TELEPHONIC COMMUNICATION REGULATIONS

BACKGROUND

Complaints regarding unsolicited and unwanted telephonic communications such as telemarketing phone calls, faxes and pre-recorded messages have led to significant new federal and state laws and regulations to protect consumers and businesses from these abusive marketing practices. Similar laws and regulations exist or have been proposed in other countries, including Canada, Australia and every country in the European Union.

Certain regulations, such as the United States Federal Trade Commission's (FTC) Telemarketing Sales Rules, require that a business maintain a list of telephone numbers for consumers who express a desire not to be solicited by telephone, known as a "Do-Not-Call" (DNC) list, and take appropriate measures to ensure that outgoing calls to telephone numbers on DNC lists are blocked. The DNC lists may include one or more lists specific to a particular business, as well as state-wide, national and industry-imposed lists such as the Direct Marketing Association Telephone Preference Service list. Other DNC regulations may define how, when, to whom and under what conditions consumers and businesses may be contacted. A single violation of a federal or state DNC regulation can result in a substantial fine.

Despite the existence of such laws and regulations, many violations occur and go unreported on a daily basis due to the often complicated effort required to file a complaint with the appropriate regulatory authority. In most cases the complaining party must file the complaint through a website by identifying the offending party, the complaining party, and the date and time of the violation. In practice, the process of having to know where to file the complaint, efficiently collecting the required information and taking the time to actually file the complaint, eliminates all but a very small percentage of viable and enforceable complaints.

SUMMARY

In an embodiment, a method comprises receiving call information to record a complaint from a called party against a calling party relating to receipt of a call and adding the call information to a complaint database. The call information may be retrieved from the complaint database and a check made for a match between called party information in a regulatory database and the call information. The call information may be updated in the complaint database based on results of the match checking. Reverse lookup information in a third party database may be requested with the call information updated in the complaint database based on results of the request. An entity, such as a telemarketing company, consumer, consumer advocacy group and regulatory body, may request complaint information from the complaint database. In response to the request, an application server may retrieve the requested complaint information from the complaint database and deliver the retrieved complaint information to the entity.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates an example record of a DNC complaint database that stores and manages DNC complaint data.

DETAILED DESCRIPTION

Figure 1:
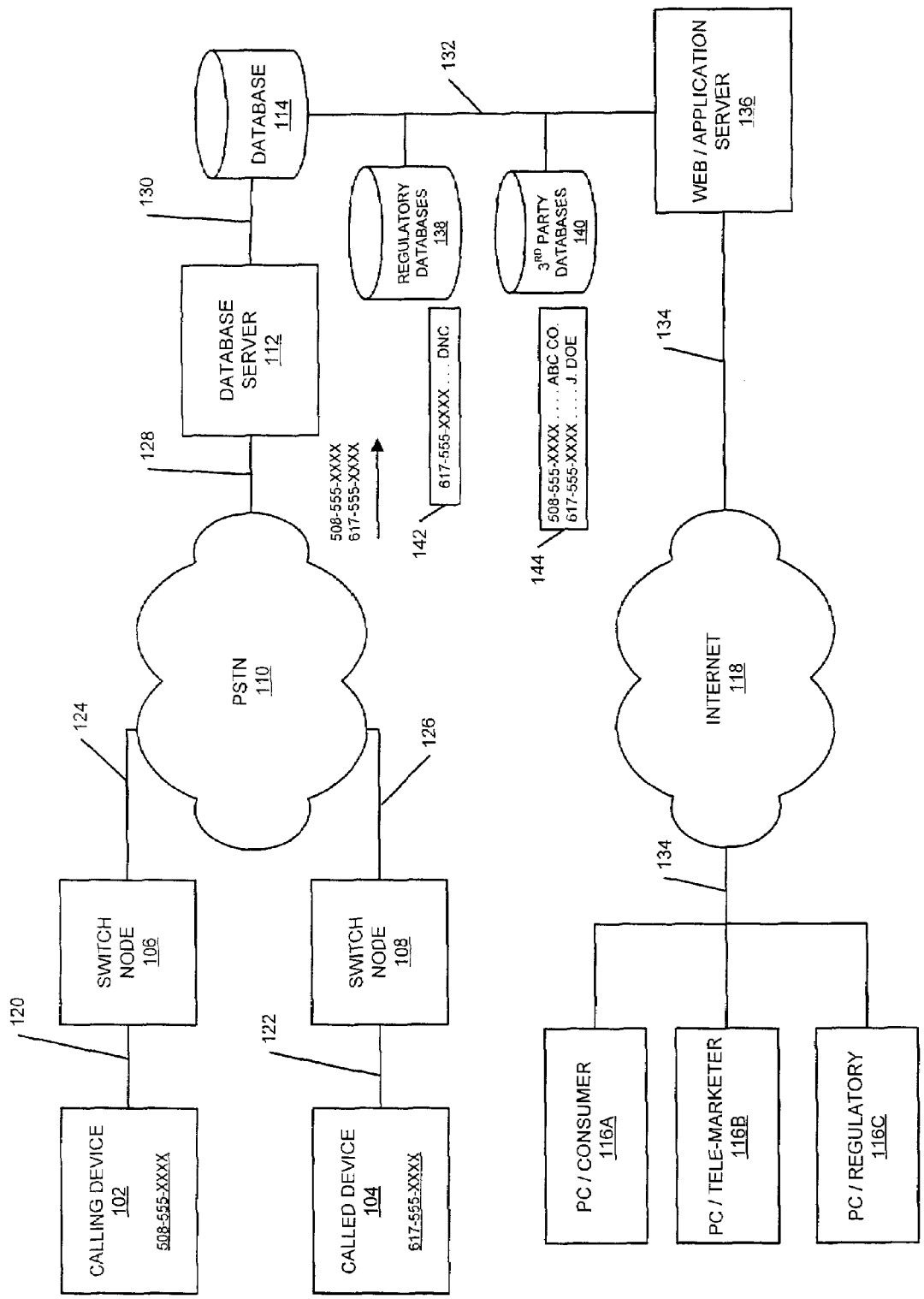
FIG. 1 illustrates an embodiment of a communication system.

FIG. 1 illustrates an example communication system that illustrates principles of the present approach. Calling device 102 and called device 104 connect to telecommunication network 110 through respective switch nodes 106, 108. In the example shown, the network 110 is the public switched telephone network (PSTN) and may be understood to include the switch nodes 106, 108. It is also understood that the present approach may be applied to any network capable of providing a communication connection between an origin and destination. In other embodiments, the network 110 may comprise wireless, wireline, private or public network elements a virtual private network within the Internet, a wide area network, local area network, Voice over Internet Protocol network, or the like, or any combination thereof. The network 110 may be implemented using any appropriate transmission, switching and routing technologies, including but not limited to Internet Protocol (IP), Asynchronous Transfer Mode (ATM) and Signaling System 7 (SS7).

The communication system further includes database server 112, complaint database 114, web/application server 136, regulatory databases 138, third party databases 140, personal computers 116 and Internet 118.

Calling device 102 and called device 104 are communication devices such as wireline telephones, wireless telephones, facsimile machines and answering machines. For purposes of example, the device 102 is referred to as "calling device," indicating that it is the device that originates a telemarketing call. Likewise, device 104 is referred to as "called device," indicating that it is the device that receives the telemarketing call.

Calling device 102 and called device 104 connect via links 120, 122 to the switch nodes 106, 108, respectively. The switch nodes may be private branch exchanges or local processing switches often referred to as central office switches. The switch nodes 106, 108 are connected via links 124, 126, respectively, to PSTN 110. A central office switch may comprise any class 5 switch, for example, that includes memory and processor elements for storing and executing software routines for call processing, including providing access to the network 110 and various call features. In an embodiment, the central office switch includes a dual-tone multi-frequency (DTMF) receiver for receiving and processing DTMF signals sent from devices 102, 104.

In the example communication system shown in FIG. 1, the switch nodes 106, 108 are shown as single entities. However, it is understood that such switch nodes may include multiple physical switches. It is also understood that, depending on the relative locations of the calling party and the called party, the switch nodes 106, 108 may be one and the same switch node.

The links 124, 126 may be one or more links that transport payload information and signaling information on the same link or on separate links. The payload information may include voice information and additional information such as video, data, commands and text.

In an embodiment, data links 128 connect network 110 to database server 112. The database server 112 connects to a complaint database 114 over data links 130. As described further herein with respect to FIGS. 2-6, the database server 112 and web/application server 136 manage storage and retrieval of information relating to complaints concerning violations of telephonic communication regulations, such as violation of do-not-call regulations.

In an embodiment, data links 132 connect the complaint database 114, regulatory databases 138, third party databases 140 to web/application server 136. As described with respect to FIG. 6, the web/application server 136 manages access to the complaint database 114 by entities such as telemarketing companies, consumers, consumer advocacy groups and regulatory bodies. Such entities may access the database 114 over a global data network (e.g., Internet 118) using PCs 116A, 116B, 116C configured with appropriate browser (e.g., secure web portal) or other application software.

A secure web portal provides regulatory bodies, businesses and consumers with access to review any complaint logs associated with their marketing and other telephonic activity or individual complaints. Access to the information may be provided after a registration process (e.g., as described with the example flow of FIG. 6 below) to ensure that access is limited to appropriate information and that security is maintained to avoid any unauthorized access. This capability can provide tremendous value to regulatory bodies, consumers and businesses alike. Businesses receive the benefit of a tremendous self regulation tool to assist them in managing their risk and identifying weaknesses in their systems and processes throughout their entire organization. Consumers benefit by having the ability to track and access their filed complaints to provide additional information to regulatory bodies in support of any potential violations. Regulatory bodies may also benefit with access to the complaint information to monitor compliance by companies to various telephonic communications regulations. In addition, call statistics and thresholds may be generated for repeat telemarketers or called directory numbers.

The regulatory databases 138 may include prohibited directory numbers derived from any one or a combination of a Federal do-not-call list, a state do-not-call list, an industry-specific do-not-call list, a client internal list and other defined lists. These lists may be periodically synchronized with other lists that are remotely located at another facility such as a local administration facility, local exchange carrier, central administration facility, or another facility. The regulatory databases 138 may be associated with an automated call compliance management system, such as the Call Advisor product available from Gryphon Networks Corp., Norwood, Mass.

The third party databases 140 may be any commercially available or custom database or database service that includes reverse-number lookup data, such as business or personal name and address information.

As will be appreciated, the servers 112, 136 and databases 114, 138, 140 may reside on the premises of a client, a local exchange carrier, local administration facility, central administration facility, or other remote facility.

Figure 2:
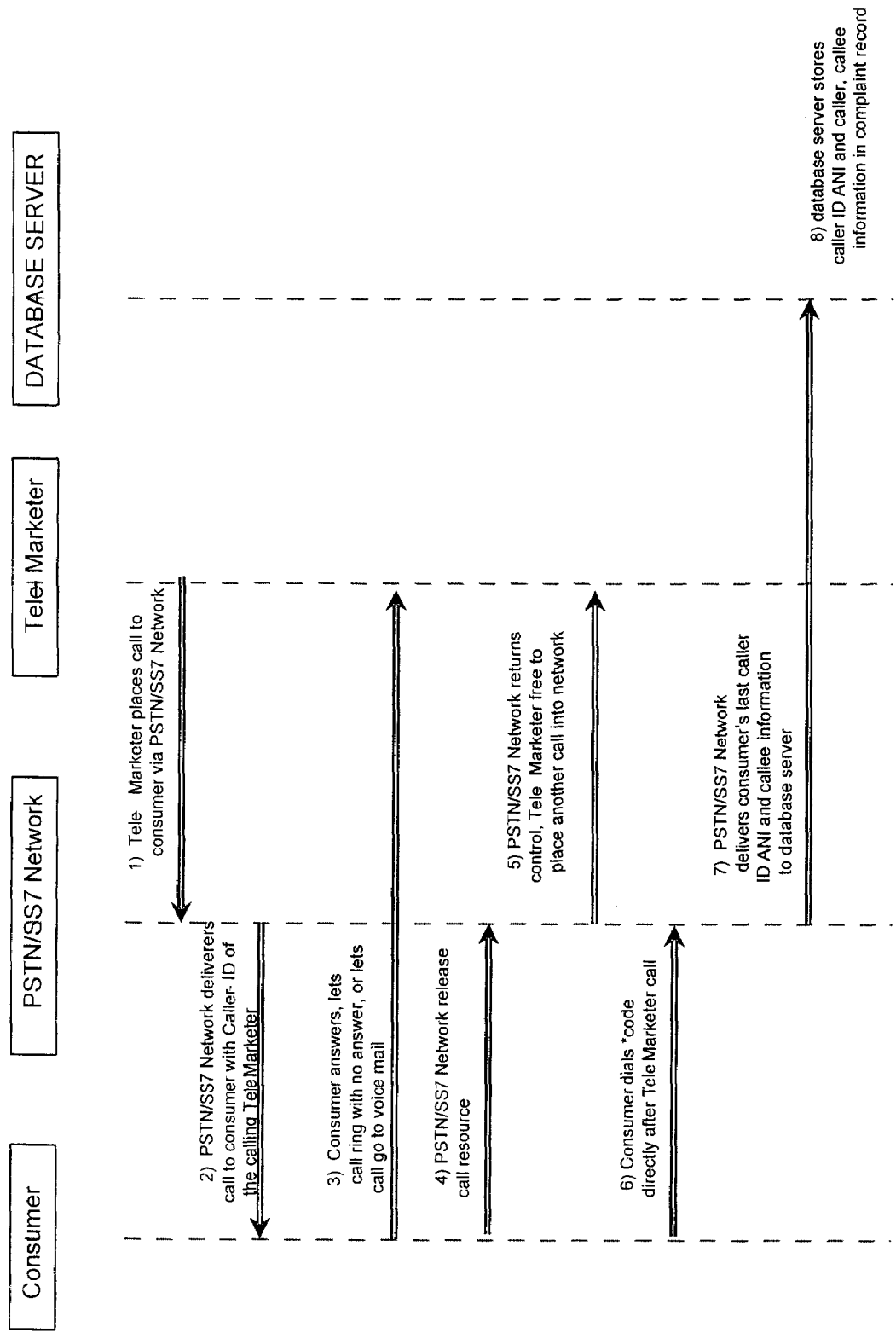
FIG. 2 illustrates an example call flow for the communication system of FIG. 1.

FIG. 2 illustrates an example call flow relating to a method that may be implemented in the communication system of FIG. 1 to provide for automatic registration of complaints for violations of telephonic communication regulations. The call flow illustrates interactions among a consumer associated with called device 104 (FIG. 1), PSTN network 110, a telemarketer associated with calling device 102 and the database server 112. The consumer in this example call flow is also referred to as the called party and the telemarketer is referred to as the calling party.

In the first interaction, the telemarketer (calling party) places a call to the consumer (called party) over the PSTN network by dialing the called party's directory number, e.g., 617-555-XXXX. Next, the PSTN delivers the call to the consumer, optionally with calling number delivery or caller-ID information. Caller-ID allows the called device to receive a calling party's directory number and the date and time of the call during the first four second silent interval in the ringing cycle. In this example, the calling party directory number is 508-555-XXXX. In the third interaction, one of the following three actions may occur: the consumer may answer the call; the call may ring with no answer; or the call may be directed to an answering machine or voicemail service. Next, at the termination of the call, the PSTN releases any call resources associated with the consumer. Additionally, the PSTN returns control such that the telemarketer is free to place another call into the network.

In the example shown in FIG. 2, the consumer dials a * code, e.g., *38, to effect registration of a complaint after the call is ended. In other embodiments, the consumer may elect to register a complaint concerning the calling party during the call, after reviewing a recorded message of the call or after reviewing captured Caller-ID information at the called device. The complaint may be based upon the consumer having determined that the call was received from a telemarketer to whom the consumer had previously requested do-not-call treatment. Another basis for the complaint may be that the consumer may have previously entered the consumer's directory number in a do-not-call registry such as through a do-not-call registry website run by the FTC.

In an embodiment, the PSTN receives the entered * code as a DTMF signal. Upon processing the DTMF signal, the PSTN delivers the directory number of the last calling party (e.g., 508-555-XXXX) to the database server 112. In addition, the PSTN may deliver the directory number of the called party (e.g., 617-555-XXXX) as well as the time and date of the call. The database server receives the call information and stores the information in complaint database 114.

While the call example described in connection with FIGS. 1-2 shows a consumer as the called party, it should be understood that the called party can also be another business or other entity. Likewise, the calling party, depicted herein as a telemarketer for illustrative purposes, can also be some other entity such as a non-telemarketer.

An example data record 300 for storing the complaint information is shown in FIG. 3. The record 300 includes fields for calling party directory number 302, called party directory number 304, date of call 306, time of call 308, reverse lookup information for the calling party 310, reverse lookup information for the called party 312, called party complaint notes 314, regulatory database number violated 316 and other information 318. The reverse lookup information 310, 312 may include the name and address associated with the respective directory numbers of the calling and called parties based on, for example, entries 144 found in third party databases 140 (FIG. 1). The called party complaint notes 314 may include notes entered by the called party through a secure web portal for accessing the complaint database 114 (FIG. 1). The regulatory database number violated 316 may indicate a particular regulatory database entry or index (e.g., entry 142 in regulatory databases 138, FIG. 1) associated with the type of violation, e.g., federal, state or other do-not-call list. The other information field 318 may include other identifying information associated with the call, such as PSTN trunk and line equipment information.

Figure 4:
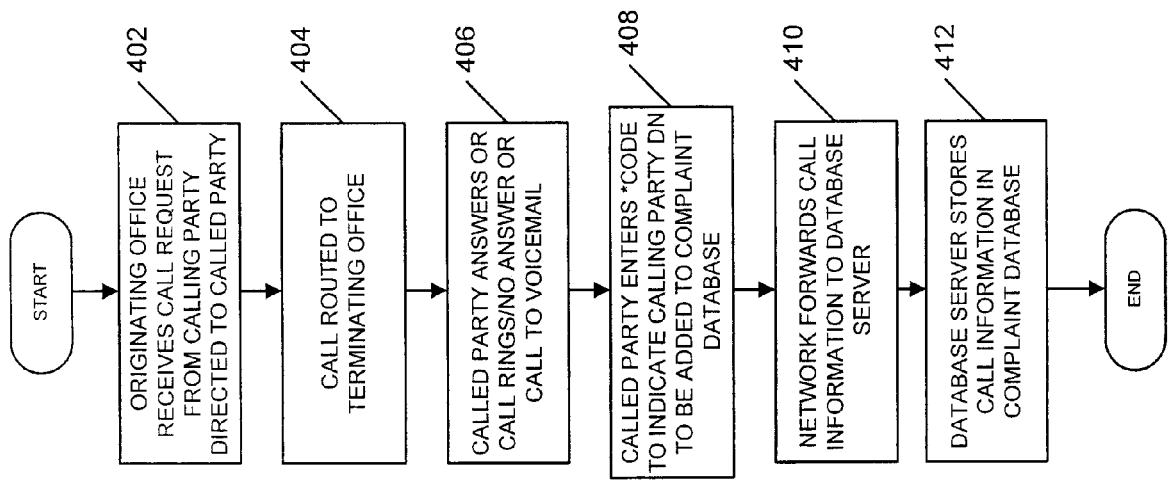
FIG. 4 illustrates a first process for the communication system of FIG. 1.

Referring now to FIG. 4, a process is shown corresponding to the call flow of FIG. 3. At 402, an originating office (e.g., switch node 106, FIG. 1) receives a call from calling party associated with device 102 directed to called party associated with device 104. The call is routed to a terminating office (e.g., switch node 108) at 404. At 406, the called party may answer the call, not answer the call or allow the call to proceed to an answering machine or voicemail service. The called party may determine that the call is unwanted and that the calling party has violated a regulation such as do-not-call regulations. To automatically register a complaint for such violation, the called party at 408 enters a particular * code to indicate that the calling party directory number is to be added to a complaint database 114. At 410, the network 110 forwards the calling party directory number and optionally other related call information to the database server 112. The database server stores the call information in the complaint database at 412.

Figure 5:
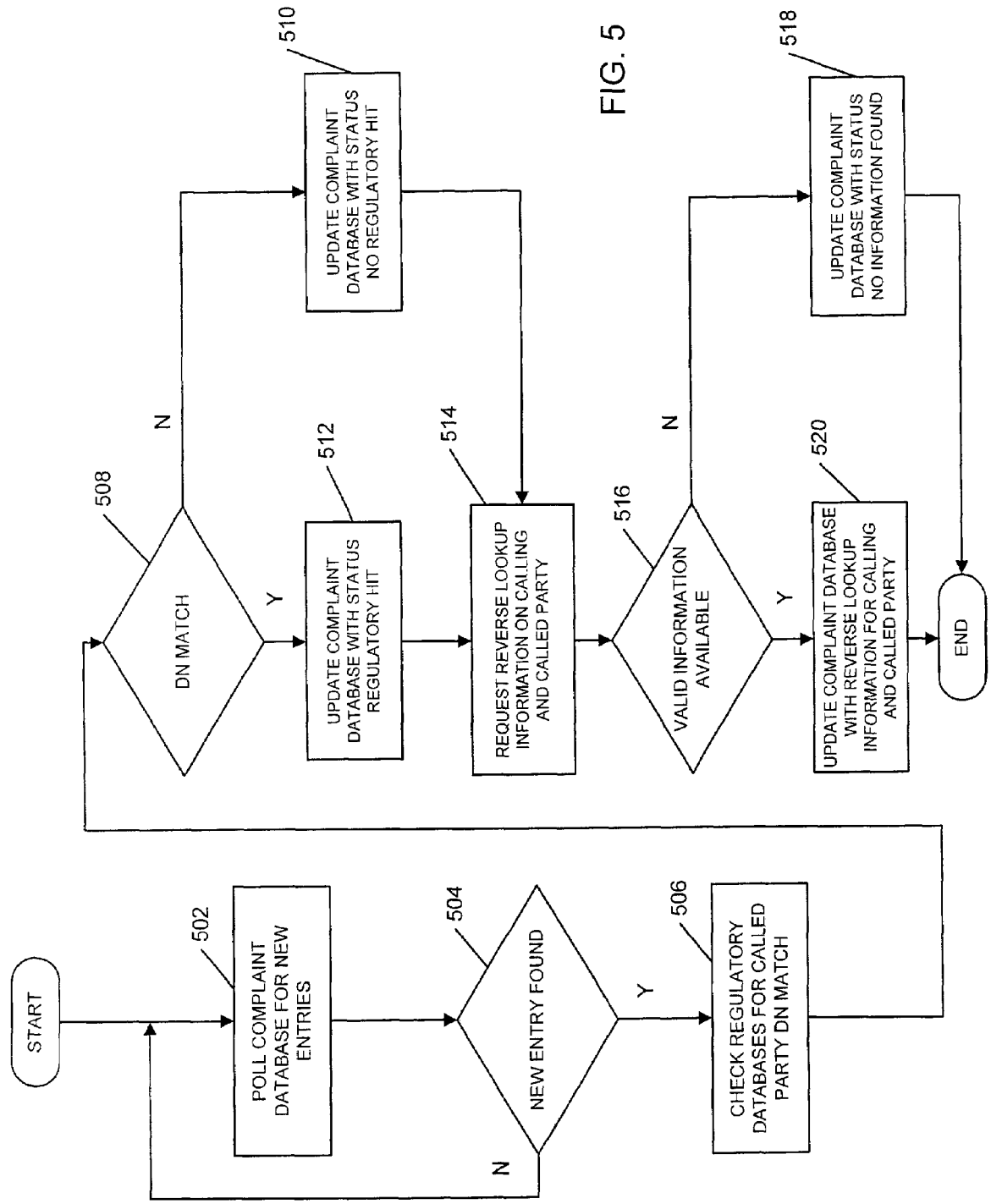
FIG. 5 illustrates a second process for the communication system of FIG. 1.

FIG. 5 illustrates a process for the application server 136 (FIG. 1) to manage updating the complaint information stored on database 114. At 502, the application server polls the complaint database 114 for new entries. If the server determines at 504 that the complaint database has a new entry, then the server checks the regulatory databases 138 (FIG. 1) for a match based on the directory number of the called party at 506. This may include prohibited directory numbers derived from any one or a combination of a federal do-not-call list, a state do-not-call list, an industry-specific do-not-call list, a client internal list specific to the calling party and other defined lists. If the server determines at 508 that there is not a hit in the regulatory databases, the server updates the complaint record entry at 510 with a status indicating that no regulatory hit was found. If there is a hit in the regulatory databases, the server updates the complaint record entry at 512 with a status indicating that a regulatory hit was found. The status may include an indication of the type of violation, e.g., entry on a federal do-not-call list.

At 514, the process continues with the application server requesting reverse lookup information from one or more third party databases 140 based on the respective directory numbers of the calling and called party. If the server determines at 516 that valid reverse lookup information is not available, the server updates the complaint record entry at 518 with a status indicating that no information was found. If there is valid information available, the server updates the complaint record entry at 520 with the reverse lookup information retrieved from the third party databases 140.

Figure 6:
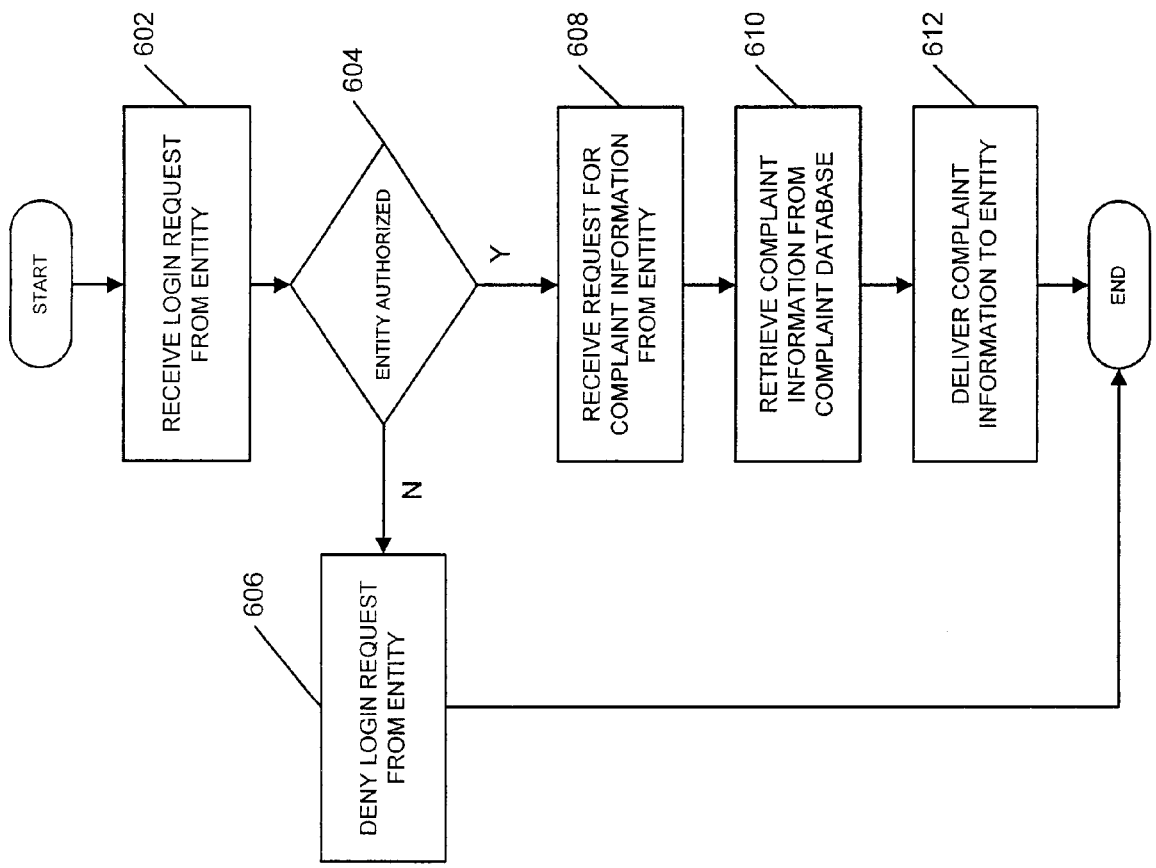
FIG. 6 illustrates a third process for the communication system of FIG. 1.

FIG. 6 illustrates a process for the application server 136 (FIG. 1) to manage access to complaint information stored on database 114. At 602, the application server receives a login request from an entity such as a telemarketing company, consumer, consumer advocacy group or a regulatory body through PCs 116A, 116B, 116C (FIG. 1). As noted above, the application server may include a web service that provides web access, e.g., a secure web portal as known in the art. If the entity is not authorized to access the database at 604, then the application server denies the request at 606. Otherwise, the process continues at 608 with receipt of a request for complaint information from the entity. The request for complaint information may be in the form of a database query using conventional database software. The entity may be restricted to particular portions of the stored complaint data records based on various levels of user access. For example, the data may be restricted based on the name of the business entity associated with each individual complaint. If the query is authorized, then at 610 the application server retrieves the requested information and delivers the information to the entity at 612.

The process illustrated in FIG. 6 relates to delivery of complaint information based on requests made by entities. In other embodiments, complaint information may be forwarded to an entity on a periodic basis (e.g., instantly, daily or monthly) or based on the occurrence of a type of violation event, without requiring a request for the information.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for preparing and delivering a report of an unwanted call to a reporting authority following the call's completion, comprising:
   a telephone set, smart phone, or other communications phone or device capable of delivering voice and data;
   a switching element in communication with said phone or device and including a data register for storing only a called party's most recent calling party number; and
   a third party node for receiving reports of an unwanted call, said node including a processor adapted to receive and decode network SS7 signaling messages from a switching element, and a database comprising call blocking records;
   wherein said switching element includes 1) receiver and delivery components capable of respectively receiving and delivering voice and signaling data, 2) a SS7 message encoder and a SS7 message delivery engine, and 3) programmed instructions to accept, upon completion of a call, a particular customer-generated signaling code, said code indicating the type of complaint from among types of a do-not-call violation or perceived harassment; in response thereto said switching element preparing and delivering a network SS7 signaling message, said message being directed to said third party node and including data from said register and indication of the type of complaint; and in response thereto said third party node analyzing a list of called party numbers, determining if the called party number is on said list, and updating said list based on said call and said analysis.

2. The system of claim 1 wherein said unwanted calls are telemarketing calls.

3. The system of claim 1 wherein said third party node includes storage capability and the ability to store information from a plurality of signaling messages.

4. The system of claim 1 wherein said third party node receives voice messages and is programmed to associate voice messages with network SS7 signaling messages.

5. The system of claim 1 wherein said third party node receives data messages and is programmed to associate said data messages with network SS7 signaling messages.

6. A method for a user-controlled and telephony and data-enabled device to report a complaint to a reporting authority after termination of a call from a calling party to a called party, comprising the steps of:
   delivering a user dialed signaling sequence to a Public Switched Telephone Network (PSTN) switching element, said delivery triggering preparation of a SS7 message to a third party, said message including a query for a network address for a reporting authority,
   in response thereto, preparing a complaint for delivery to said network address, said complaint including the telephone number of said called party and said calling party, said calling party number obtained from a register whose content is limited to the most recent calling party number and within said switching element, and delivering a content message directed to said network address using a data network, said content message including a user-prepared description of the complaint,
   wherein said signaling sequence indicates a characteristic of the call received, said switching element has the ability to construct and deliver SS7 signaling messages, and said complaint and said content message each includes an identifier so that said reporting authority has the ability to associate said complaint with said content message.

7. The method of claim 6 wherein said call is received by a smart phone.

8. The method of claim 6 wherein said content message includes video or text.

9. A method for a processor to update data in a complaint database comprising the steps of:
   receiving information regarding a call from a switching node, said information regarding a call being associated with a complaint from a called party; said switching node including a register associated with said called party and whose content is limited to the most recent calling party number and wherein said complaint is among types of a do-not-call violation or perceived harassment, said complaint being made by said called party after termination of said call, said complaint made against a calling party and relating to receipt of said call;
   analyzing a complaint database for call blocking status relative to said calling party number, obtained from said register, and said called party number; and
   delivering instructions to said complaint database to update call blocking status based on the results of said analysis.

10. The method of claim 6 wherein said signaling sequence is a DTMF sequence.

11. The method of claim 6 wherein said signaling sequence is delivered through a mobile communications network.

12. The method of claim 6 wherein said device is known to a cellular network.

13. The method of claim 6 wherein said device has connectivity to a wireline network.

14. The method of claim 6 further comprising directing notification to the calling party based on a received complaint exceeding a complaint threshold.

15. The method of claim 6 wherein said content message is delivered as a text or short message service (SMS) message.

16. The method of claim 15 wherein said text or SMS message is delivered using the Internet.

17. The method of claim 6 further comprising instituting a call block to block calls from said calling party to said called party.

18. The method of claim 6 further comprising adding the calling party number to a database, wherein said database includes calling party numbers which are blocked due to received complaints exceeding a complaint threshold.

* * * * *